United States Patent
Fabry et al.

(10) Patent No.: US 12,515,388 B2
(45) Date of Patent: Jan. 6, 2026

(54) METHOD FOR MANUFACTURING AN INDIVIDUALLY SHEATHED STRAND, STRAND THUS OBTAINED AND STRAND MANUFACTURING INSTALLATION

(71) Applicant: SOLETANCHE FREYSSINET, Rueil Malmaison (FR)

(72) Inventors: Nicolas Fabry, Antony (FR); Ivica Zivanovic, Gouvieux (FR)

(73) Assignee: SOLETANCHE FREYSSINET, Rueil Malmaison (FR)

( * ) Notice: Subject to any disclaimer, the term of this patent is extended or adjusted under 35 U.S.C. 154(b) by 927 days.

(21) Appl. No.: 17/263,102

(22) PCT Filed: Jul. 9, 2019

(86) PCT No.: PCT/FR2019/051727
§ 371 (c)(1),
(2) Date: Jan. 25, 2021

(87) PCT Pub. No.: WO2020/025872
PCT Pub. Date: Feb. 6, 2020

(65) Prior Publication Data
US 2021/0187813 A1 Jun. 24, 2021

(30) Foreign Application Priority Data
Jul. 31, 2018 (FR) .................................... 18 57162

(51) Int. Cl.
*B29C 48/156* (2019.01)
*B29C 48/05* (2019.01)
(Continued)

(52) U.S. Cl.
CPC ............ *B29C 48/156* (2019.02); *B29C 48/05* (2019.02); *B29C 48/2883* (2019.02);
(Continued)

(58) Field of Classification Search
CPC .......... B29C 2948/92704; B29C 48/05; B29C 48/156; B29C 48/2883; B29C 48/34;
(Continued)

(56) References Cited

U.S. PATENT DOCUMENTS 9,085,832 B2 * 7/2015 Mellier .................... E04C 5/085

FOREIGN PATENT DOCUMENTS

| JP | 2002-201577 A | 7/2002 |
| WO | 2008/093651 A1 | 8/2008 |
| WO | 2012/017135 A1 | 2/2012 |

* cited by examiner

*Primary Examiner* — Lynda Salvatore
(74) *Attorney, Agent, or Firm* — BRYAN CAVE LEIGHTON PAISNER LLP

(57) ABSTRACT

The method for manufacturing an individually sheathed strand comprises: conveying a group of metal wires through a die; upstream of the die, applying a first filler product to at least a first portion of the strand; upstream of the die, applying a second filler product to at least a second portion of the strand distinct from the first portion; and extruding a plastic around the group of metal wires passing through the die, so as to envelop the group of metal wires covered with the first and second filler products in a continuous sheath formed of the extruded plastic. The second filler product has greater adhesion to the group of metal wires than the first filler product.

22 Claims, 3 Drawing Sheets

(51) Int. Cl.
  *B29C 48/285* (2019.01)
  *B29C 48/79* (2019.01)
  *B29C 48/88* (2019.01)
  *B29K 705/00* (2006.01)
  *B29L 31/00* (2006.01)
  *D07B 1/06* (2006.01)
  *D07B 1/14* (2006.01)
  *D07B 1/16* (2006.01)
  *D07B 7/12* (2006.01)
  *D07B 7/14* (2006.01)
  *E01D 19/14* (2006.01)
  *E01D 19/16* (2006.01)

(52) U.S. Cl.
  CPC ............ *B29C 48/79* (2019.02); *B29C 48/911* (2019.02); *D07B 1/0693* (2013.01); *D07B 1/144* (2013.01); *D07B 1/162* (2013.01); *D07B 7/12* (2013.01); *D07B 7/145* (2013.01); *B29K 2705/00* (2013.01); *B29L 2031/731* (2013.01); *D07B 2201/2044* (2013.01); *D07B 2201/2046* (2013.01); *D07B 2201/2076* (2013.01); *D07B 2201/2087* (2013.01); *D07B 2207/4027* (2013.01); *E01D 19/14* (2013.01); *E01D 19/16* (2013.01)

(58) Field of Classification Search
  CPC ....... B29C 48/79; B29C 48/911; B29C 48/92; D07B 1/0693; D07B 1/144; D07B 1/162; D07B 2201/2044; D07B 2201/2046; D07B 2201/2076; D07B 2201/2081; D07B 2201/2082; D07B 2201/2087; D07B 2201/2088; D07B 2201/2091; D07B 2205/201; D07B 2205/505; D07B 2205/507; D07B 2207/4027; D07B 2207/4068; D07B 2401/2025; D07B 2401/205; D07B 2501/2023; D07B 2501/203; D07B 2801/22; D07B 2801/60; D07B 5/00; D07B 7/12; D07B 7/145; D07B 7/185; E01D 19/14; E01D 19/16; E04C 5/085; B29L 2031/731
  See application file for complete search history.

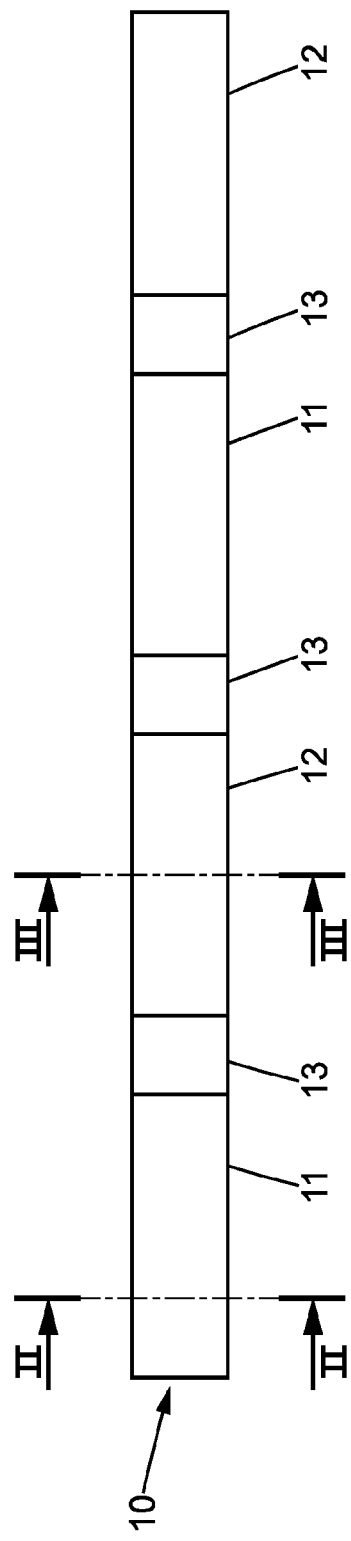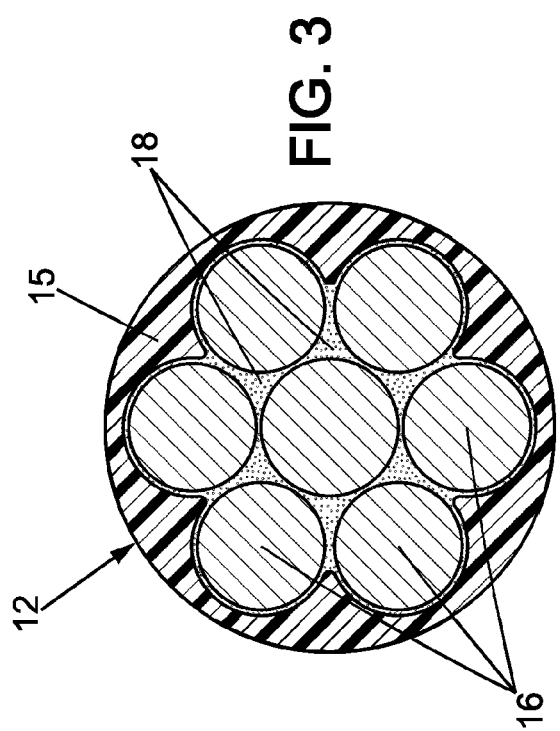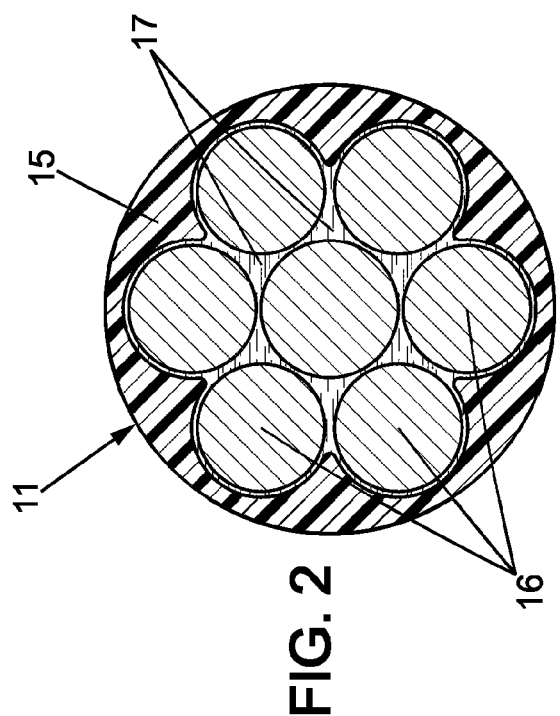

METHOD FOR MANUFACTURING AN INDIVIDUALLY SHEATHED STRAND, STRAND THUS OBTAINED AND STRAND MANUFACTURING INSTALLATION

This application is a National Stage Application of International Application No. PCT/FR2019/051727, filed on Jul. 9, 2019, which claims benefit of and priority to French Patent Application No. 18 57162, filed on Jul. 31, 2018, all of which are hereby incorporated by reference in their entirety for all purposes as if fully set forth herein.

The present invention concerns the individually protected strands used in civil engineering structures, in particular to prestress or to suspend structure portions.

BACKGROUND

The individually sheathed strands comprise a group of metal wires twisted together, usually seven in number. The metal wires are frequently subjected to an electrochemical treatment (galvanization, galfan coating, . . . ) procuring some resistance to corrosion.

Routinely used are strands individually protected by a plastic material, usually high-density polyethylene (PEHD) or epoxy, sheath that creates a sealed barrier around the metal wires. A filler product, which may be of a number of types (wax, grease, polymer, . . . ), fills the gaps that exist between the metal wires and the individual sheath to strengthen the protection of the strand against corrosion.

The filler product either allows the metal wires of the strand to slide relative to its individual sheath (sheathed and greased or sheathed and waxed strand), or to the contrary adhesion to transmit shear forces between the sheath and the strand (coherent strand).

In the coherent strand, the filler product is typically a polymer adhering to the metal wires and to the interior of the sheath. The coherent strand is in particular usable when it is necessary to transmit tangential forces from the sheath to the metal wires. See for example EP-A-0 855 471. This is the case for example in the cables supporting suspension bridges in which the load transmitted by each suspension means causes a tangential effort on the cable at the level of the suspension member attachment collar or in diverters installed on the masts of anchored structures.

In the sheathed and greased or sheathed and waxed strand, the filler product is a lubricant, which in particular has the advantage of improving the fatigue behavior of the strand by lubricating the contacts between its metal wires. See for example EP-A-1 211 350. Moreover, the greases or waxes employed in the sheathed and greased or sheathed and waxed strands are generally less costly than the resins employed in the coherent strands, with the result that the sheathed and greased or sheathed and waxed strand has a lower unit cost.

JP 2005-048405 A discloses a strand aiming to prevent the noise caused by collisions between the metal wires and the sheath. To this end, the strand includes portions where a layer of urethane foam is formed between the group of metal wires and its tubular polyethylene sheath and, alternating along the strand, portions where the sheath is tightened to be in contact with the group of metal wires.

EP-A-2 601 344 discloses a strand having portions of coherent type alternating along the strand with portions of coherent type. This strand is produced from a sheathed and waxed strand the sheath of which is removed locally, likewise the wax, before applying the resin procuring the adhesion property. This method, somewhat non-industrial, and therefore relatively costly, leads to discontinuities of the sheath on the finished strand. Moreover, it is difficult in practise to eliminate the wax so that it does not interfere with the required adhesion in the strands of coherent type. The inability to degrease these portions completely and easily limits or prevents goods adhesion of the resin (once hardened) to the steel.

An object of the present invention is to propose a reliable and economic technique for producing a strand having one or more portions with adhering sheath and one or more portions where the same sheath extends without needing to adhere to the metal wires.

SUMMARY

There is proposed a method for manufacturing an individually sheathed strand. This method comprises:
conveying a group of metal wires through a die;
upstream of the die, applying a first filler product to at least a first portion of the strand;
upstream of the die, applying a second filler product to at least a second portion of the strand distinct from the first portion, the second filler product having greater adhesion to the group of metal wires than the first filler product; and
extruding a plastic material around the group of metal wires passing through the die, so as to envelop the group of metal wires coated with the first and second filler products in a continuous sheath formed of the extruded plastic material.

The method produces a sheathed strand with composite filler under well-controlled industrial conditions. The sheath, generally of constant exterior section, provides reliable and uninterrupted protection of the coated metal wires either by a product procuring adhesion, or by a lubricating product, as required.

The invention enables manufacture of a continuous sheath covering all of the portions whilst guaranteeing the required mechanical characteristics in each portion. In particular, the adhesion of the hardened resin is not interfered with by the presence of wax in the coherent strand portions.

One particular embodiment of the method comprises:
causing the group of metal wires to move along a succession of stations as far as the die, including a filler product application station;
spreading the metal wires of the group on entering the filler product application station;
selectively applying the first filler product and the second filler product to the spread metallic wires in the filler product application station as a function of the advance of the group of metal wires in the filler product application station; and
compacting the metal wires of the group on leaving the filler product application station.

The filler product application station may comprise a first part selectively activated to apply the first filler product to the spread metal wires of the group and a second part selectively activated to apply the second filler product to the spread metal wires of the group, the second part being farther upstream than the first part relative to the die.

In one embodiment of the filler product application station, the first part comprises nozzles for spraying the first filler product directed convergently toward a line along which the spread metal wires of the group move in the filler product application station. This first part may further comprise a tray for recovering the first filler product under the spray nozzles and a system for recirculating the first filler product recovered in the tray to return it to the spray nozzles.

In one embodiment of the filler product application station, the second part of the filler product application station comprises a mixer for mixing a plurality of components and a head for depositing the mixture on the spread metal wires of the group.

An air curtain may be blown onto the group of spread metal wires between the first and second parts of the filler product application station.

One embodiment of the method comprises heating the group of metal wires ahead of the filler product application station, to a temperature between 80° C. and 140° C. inclusive, for example by induction.

One embodiment of the method comprises regulating the temperature of the group of compacted metal wires downstream of the filler product application station, the group of metal wires reaching the die, where the plastic material of the sheath is extruded, at a temperature between 60° C. and 120° C. inclusive. The regulation of the temperature of the group of metal wires downstream of the filler product application station may comprises cooling the group of metal wires to a temperature between 10° C. and 30° C. inclusive, then reheating the group of metal wires to the temperature between 60° C. and 120° C. inclusive. The cooling may be produced by a flow of air and the heating by induction.

In one embodiment of the method, the die is part of an extrusion head where there are successively deposited on the group of metal wires an adhesion primer and the plastic material of the sheath.

When the extrusion head has passed through it a portion of the strand in which the group of metal wires is coated with the first filler product, a rate of injection of the adhesion primer may be reduced relative to a moment at which the extrusion head has passed through it a portion of the strand in which the group of metal wires is coated with the second filler product.

Downstream of the die, the group of metal wires enveloped in the sheath may be cooled in a water bath.

Another aspect of the invention relates to an individually sheathed strand comprising:
- a group of metal wires;
- a continuous plastic material sheath of constant exterior section;
- a first filler product contained in the sheath with the group of metal wires in at least a first portion of the strand; and
- a second filler product contained in the sheath with the group of metal wires in at least a second portion of the strand distinct from the first portion, the second filler product having a greater adhesion to the group of metal wires and the sheath than the first filler product.

The individually sheathed strand may have at least one third portion situated between a first portion and a second portion, where a mixture of the first and second filler products is contained in the sheath with the group of metal wires. Each third portion may have a length between 20 cm and 1 m inclusive.

A further aspect of the invention relates to an installation for manufacturing an individually sheathed strand, comprising:
- a die to receive a group of metal wires;
- on an upstream side of the die, a system for applying a filler product to the group of metal wires;
- a system for extruding a plastic material around the group of metal wires conveyed through the die so as to envelop the group of metal wires coated with the filler product in a continuous sheath formed by the extruded plastic material; and
- a controller of the filler product application system for selecting a composition of the filler product applied as a function of the advance of the group of metal wires in the filler product application system from a first product and a second product having a greater adhesion to the group of metal wires and the sheath than the first product.

BRIEF DESCRIPTION OF THE DRAWINGS

Other particular features and advantages of the present invention will become apparent in the following description of nonlimiting embodiments given with reference to the appended drawings, in which:

FIG. 1 is a schematic side view of one embodiment of an individually sheathed strand in accordance with the invention;

FIGS. 2 and 3 are views of that individually sheathed strand in cross-section on the planes II-II and indicated in FIG. 1;

DESCRIPTION OF EMBODIMENTS

Figure 4:
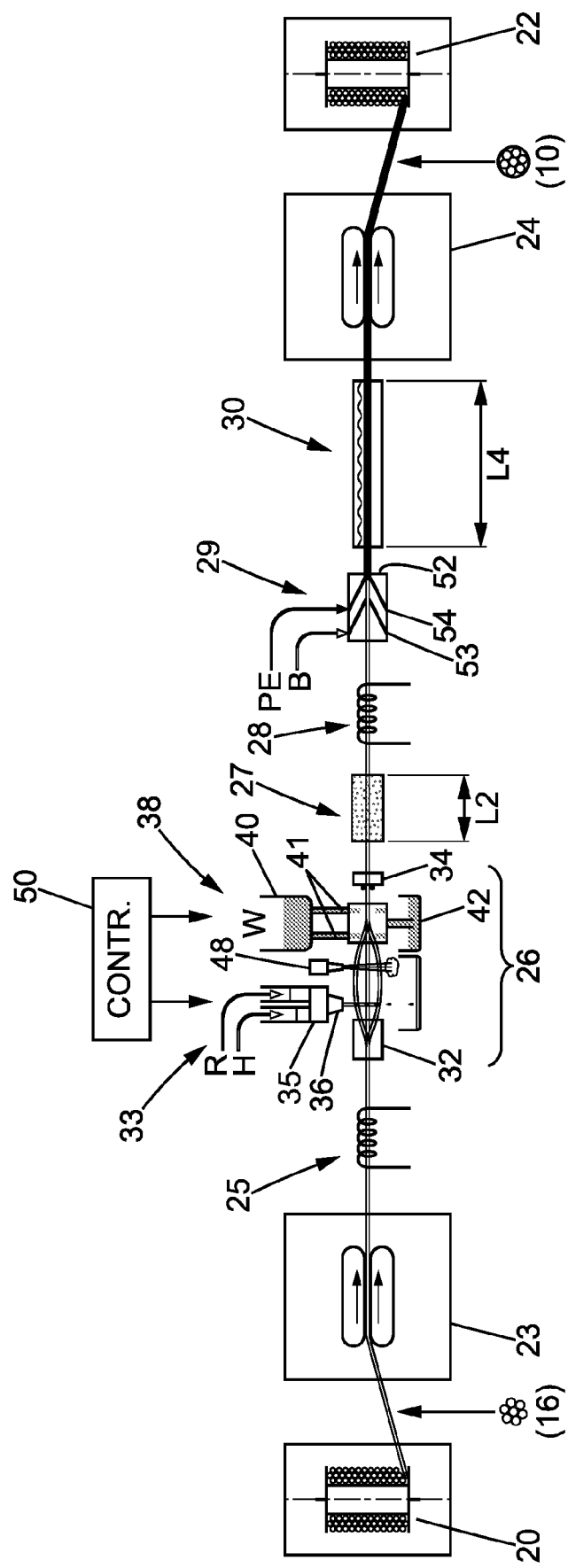
FIG. 4 is a schematic of one example of a manufacturing installation in accordance with the invention.

FIGS. 1 to 3 show an individually sheathed strand 10 which, along its length, has in succession portions 11 in which the sheath 15 of the strand does not adhere to the group of metal wires 16 and portions 12 in which the sheath 15 adheres to the group of metal wires 16.

In the example represented, the metal wires 16 of the group are seven in number, with a substantially rectilinear central wire (when the strand 10 is itself rectilinear) and six peripheral wires twisted around the central wire.

A flexible filler product fills the interstices with a curvilinear triangle shape section that extend helicoidally around the central wire and also covers the exterior of the peripheral wires. This filler product is contained with the group of metal wires 16 inside the sheath 15.

The sheath 15 is made of PEHD for example.

In the portions 11 of the strand 10 the filler product 17 has lubricating properties. It may in particular be a wax or a grease. In the remainder of the present description it is considered that the filler product 17 is a wax, without this limiting the invention.

In the portions 12 of the strand 10 the filler product 18 adheres both to the metal wires 16 and to the internal surface of the sheath 15. It is thus able to resist shear stresses that develop when tangential forces are transmitted from the sheath 15 to the wires 16. In the remainder of the present description it is considered that the filler product 18 is a resin, without this limiting the invention.

The sheath 15 extends continuously around the group of metal wires 16 all along the strand 10. The portions 11 and the portions 12 alternate along the length of the strand.

As FIG. 1 shows, there may exist between them transition portions 13 in which it is a mixture of the products 17 and 18 (for example wax and resin) that is contained in the sheath 15 with the group of metal wires 16. The transition portions 13 typically have a length between 20 cm and 3 m inclusive. That length may be from 40 to 50 cm for example.

In one application example the individually sheathed strand 10 is part of an anchor of an anchored structure such as a bridge. In some anchored structure designs the anchors are diverted in a saddle mounted on a mast. In that saddle the strands that constitute an anchor are diverted without degrading their mechanical strength. Sufficient friction must exist between the strands and the ducts of the saddle each of which receives a strand for optimum take-up by the mast receiving the saddle of the differential forces to which the anchor is subjected on either side of the mast. In this application, the strands 10 constituting the anchor can be manufactured so that a portion 12 with adhesion is located in the body of the saddle while portions 11 without adhesion are formed on the rest of the strand to constitute the main part of the anchor. In this main part, which generally constitutes the majority of the length of the anchor, the friction that exists between the metal wires 16 of the strands is limited by the lubrication provided by the wax 17. Furthermore, as the wax 17 is generally less costly than the adhesive resin 18, the additional cost generated by the necessity to have adhesion at the level of the saddle remains limited.

The transition portions 13, which are the result of the method of manufacturing the individually sheathed strand, do not interfere with the mechanical behavior of the strand. To the contrary, they are advantageous because they avoid a sudden transition between a portion 12 with adhesion and a portion 11 without adhesion.

An installation for manufacturing an individually sheathed strand of this kind is represented schematically in FIG. 4.

The group of metal wires 16 (bare strand possibly galvanized or galfan-coated), manufactured beforehand, is fed onto a drum 20 from which it is unwound to be conveyed along the installation. The finished product is the individually sheathed strand 10 which, once the operations have ended, is wound onto another drum 22 on which it can be stored and transported.

To drive the strand along its path in the installation two caterpillar track driving devices 23, 24 are provided, for example, one which takes up the bare strand 16 on the drum 20 and the other which pulls on the individually sheathed strand 10 to convey it to the drum 22. If necessary, other drive devices may be provided along the path.

Various treatment stations 25-30 extend in succession along the path of the strand in the installation.

A first station situated downstream of the drive device 23 is a coil 25 in which the bare strand 16 is heated to a temperature $T_1$. The temperature $T_1$ is typically between 80° C. and 140° C. inclusive. Induction heating is efficient and avoids having to bring a heating element into contact with the metal wires.

Then a filler product application station 26 selectively applies wax 17 or resin 18 between and around the metal wires 16 of the strand.

The station 26 comprises firstly a spreader 32 that grips the peripheral wires of the strand and applies torsion to them to spread them. The metal wires therefore pass through the station 26 in a spread configuration. After the spreader the station 26 comprises two parts 33, 38 for respectively depositing the resin 18 and applying the wax 17.

The part 33 comprises a head 36 directed toward the group of spread wires to deposit thereon one or more resin beads 18. When thereafter the metal wires are compacted, the resin 18 that has been deposited in a paste-like state is deformed to fill in the internal interstices of the strand and to overflow onto its exterior surface. At the downstream end of the station 26 a shaper 34 verifies that the metal wires 16 have been correctly replaced in their compacted configuration and eliminates the excess resin 18.

The resin 18 is typically a two-component resin. The head 36 is then connected to a mixer 35 that mixes the components, namely the polymer base R of the resin and a hardener H, before sending the mixture to the head 36.

Downstream of the part 33 serving to deposit the resin 18, the station 26 comprises the part 38 serving to apply the wax 17.

To manufacture a sheathed and waxed strand, the bare strand is usually caused to circulate in a bath of fluidized wax after which the excess wax is removed by a template around the strand coated in this way. However, that method is not appropriate in the context of the method in accordance with the invention because the aim is to prevent the presence of wax in the portions 12 with adhesion of the individually sheathed strand 10.

The part 38 preferably includes a tank 40 into which the wax W is conveyed and heated to its application temperature, at which it is in the fluid state, nozzles 41 for spraying the wax in the fluid state onto the spread metal wires of the strand, a tray 42 under the strand for recovering wax that has dripped and the nozzles 41, and a recirculation system (not represented) for returning the wax recovered in the tray 42 to the tank 40 and the spray nozzles 41.

Figure 5:
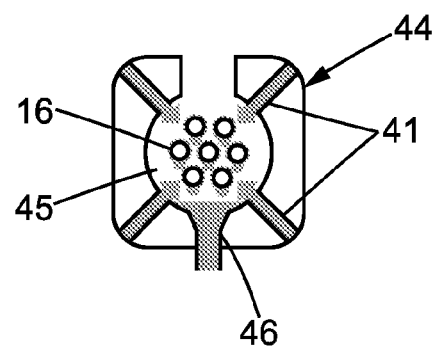
FIG. 5 is a cross-sectional schematic of a part of the installation used to apply wax to the metal wires of strand.
Figure 6:
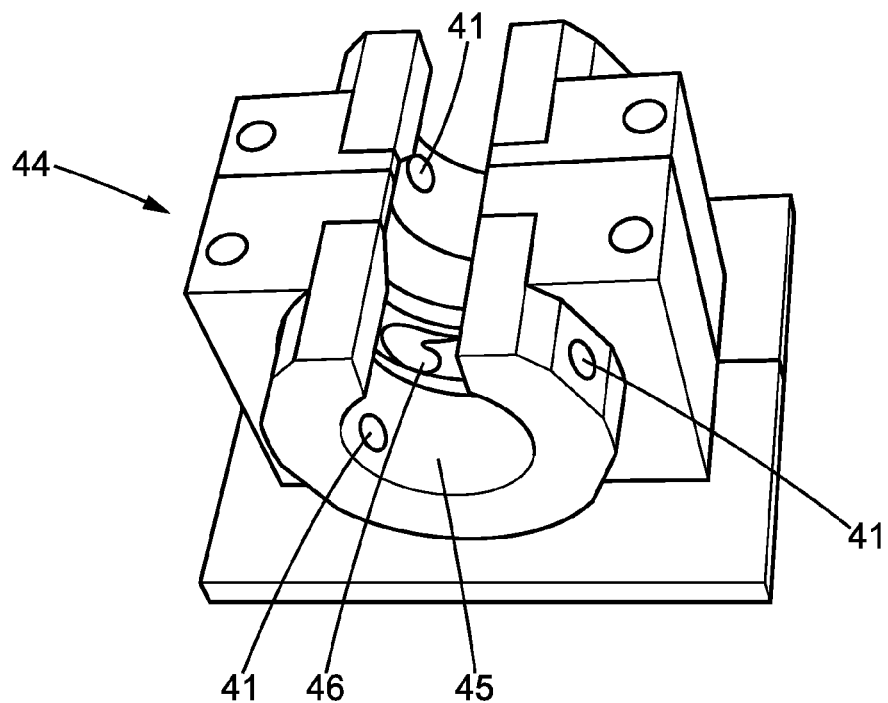
FIG. 6 is a perspective view of the part represented in FIG. 5.

The spray nozzles 41 may be formed in a body 44 represented in FIGS. 5 and 6. This body 44 includes a bore 45 in which the spread metal wires of the strand circulate. The nozzles 41 are formed in the wall of the bore 45. In the example represented there are two sets of four nozzles 41 that extend in succession along the path of the strand. In this example each set includes four nozzles that converge toward the direction of movement of this strand, for example being oriented at 90° to one another as represented schematically in FIG. 5. In its lower part the bore 45 includes a hole 46 for the evacuation of the excess wax toward the tray 42.

As shown schematically in FIG. 4, the part 38 serving to apply the wax is situated in the zone in which the metal wires 16 of the strand are compacted into a compact formation. In particular, the first set of nozzles 41 may be placed at a location where the metal wires 16 are still spread while the second set of nozzles 41 is placed slightly downstream, where the metal wires 16 come to be compacted. This therefore ensures that the wax is not evacuated excessively and that sufficient thereof remains ins the interstices of the strand. The second set of nozzles 41 ensures sufficient coating of the periphery of the strand.

On leaving the station 26 the shaper 34 eliminates the excess resin 18 or the excess wax 17, as appropriate.

To prevent the part 33 of the station 26 from interfering with the part 38, the separation between those two parts may be produced by a compressed air curtain blown by a compressor 48.

The parts 33, 38 of the filler product application station 26 are controlled by a controller 50 in order for the flow rate of resin applied by the head 36 and the flow rate of wax sprayed by the nozzles 41 to be selected as a function of the advance of the strand in the station 26. When it is a portion 11 of the strand 10 that is circulating in the station 26 the controller 50 activates the part 38 and deactivates the part 33. Conversely, when it is a portion 12 of the strand 10 that is circulating in the station 26 the controller 50 activates the part 33 and deactivates the part 38.

Thus the controller 50 enables close control of the location of the of portions 12 with adhesion and of the portions 11 without adhesion of the individually sheathed strand 10. It is therefore possible to adjust at will the spatial distribution of the portions 11, 12 to adapt the strand 10 to suit the structure which is intended to be equipped with it.

In the transitions between the portions 11 and 12 the controller 50 also regulates the quantities of filler products in order to form the transition portions 13 in the required manne.

Downstream of the station 26 the temperature of the strand coated with resin or with wax is regulated in the stations 27, 28 on the one hand to allow the resin 18 to harden and on the other hand to ensure an appropriate temperature for the approach of the strand into the extrusion head 29.

Firstly, the station 27 is an air-cooling tunnel with a length from 5 m to 10 m, for example, to cool the coated strand to a temperature $T_2$ between 10° C. and 30° C. inclusive.

Thereafter, the station 28 is another coil that heads the metal wires of the strand to a temperature $T_3$ less than the aforementioned temperature $T_1$. The temperature $T_3$ is for example between 60° C. and 120° C. inclusive.

On leaving the coil 28, the strand penetrates into the extrusion head 29. The extrusion head 29 includes the die 52 at its downstream end. Just upstream of the die 52 is the injection system for successively introducing, at the periphery of the strand, an adhesion primer B and then polyethylene PE brought to the liquid state in order to form the sheath 15 after cooling. The ducts 53 for injecting the adhesion primer B are situated immediately upstream of the ducts 54 for injecting the polyethylene PE, which are themselves situated immediately upstream of the die 52 in the extrusion head 29.

The primer B ensures the adhesion of the sheath 15 onto the resin 18 deposited in the portions 12 of the strand 10. In one particular example this is a polymer marketed under the mark Orevac by the company Arkema. In the portions 11 of the strand 10 it is preferable not to stop the flow of the adhesion primer B in the injection system in order not to disturb the latter. This flow rate may be reduced, however, because the adhesion primer B is not necessary in the sections 11. The primer B adheres to the internal surface of the sheath 15 but does not interfere with the behavior of the lubricating wax in the portions 11.

Downstream of the die 52 the final station of the installation ahead of the caterpillar track driver device 24 is a water bath 30 in which the group of metal wires 16 enveloped in the sheath 15 is cooled to room temperature, i.e. between 10° C. and 30° C.

The embodiments described hereinabove are merely an illustration of the present invention. Various modifications may be made to them without departing from the scope of the invention that emerges from the appended claims.

The invention claimed is:

1. A method for manufacturing an individually sheathed strand, the method comprising:
conveying a group of metal wires through a die;
upstream of the die, applying a first filler product to a first portion of the strand, the first filler product filling the interstices between the metal wires and surrounding the metal wires in the first portion of the strand;
upstream of the die, applying a second filler product to a second portion of the strand distinct from the first portion, the second filler product being distinct from the first filler product, the second filler product filling the interstices between the metal wires and surrounding the metal wires in the second portion of the strand, the second portion of the strand being void of first filler product and the first portion of the strand being void of second filler product, the first and second portions extending in succession along the strand, the second filler product having greater adhesion to the group of metal wires than the first filler product; and
extruding a plastic material around the group of metal wires passing through the die, so as to envelop the group of metal wires coated with the first and second filler products in a continuous sheath formed of the extruded plastic material, the continuous sheath having a constant exterior section, wherein in the first portion of the strand, the continuous sheath surrounds exclusively the group of metal wires and the first filler product, and wherein in the second portion of the strand, the continuous sheath surrounds exclusively the group of metal wires and the second filler product, the second filler product having a greater adhesion to the continuous sheath than the first filler product.

2. The method as claimed in claim 1, comprising:
causing the group of metal wires to move along a succession of stations as far as the die, including a filler product application station;
spreading the metal wires of the group on entering the filler product application station;
selectively applying the first filler product and the second filler product to the spread metallic wires in the filler product application station as a function of the advance of the group of metal wires in the filler product application station; and
compacting the metal wires of the group on leaving the filler product application station.

3. The method as claimed in claim 2, in which the filler product application station comprises a first part selectively activated to apply the first filler product to the spread metal wires of the group and a second part selectively activated to apply the second filler product to the spread metal wires of the group, the second part being farther upstream than the first part relative to the die.

4. The method as claimed in claim 3, in which the first part of the filler product application station comprises nozzles for spraying the first filler product directed convergently toward the spread metal wires of the group.

5. The method as claimed in claim 4, in which the first part of the filler product application station further comprises a tray for recovering the first filler product under the spray nozzles, and a system for recirculating the first filler product recovered in the tray to return it to the spray nozzles.

6. The method as claimed in claim 2, in which the second part of the filler product application station comprises a mixer for mixing a plurality of components and a head for depositing the mixture on the spread metal wires of the group.

7. The method as claimed in claim 2, in which an air curtain is blown onto the group of spread metal wires between the first and second parts of the filler product application station.

8. The method as claimed in claim 2, comprising:
heating the group of metal wires ahead of the filler product application station, to a temperature between 80° C. and 140° C. inclusive.

9. The method as claimed in claim 8, in which the group of metal wires is heated ahead of the filler product application station by induction.

10. The method as claimed in claim 2, comprising:
regulating the temperature of the group of compacted metal wires downstream of the filler product application station, the group of metal wires reaching the die, where the plastic material of the sheath is extruded, at a temperature between 60° C. and 120° C. inclusive.

11. The method as claimed in claim 10, in which the regulation of the temperature of the group of metal wires downstream of the filler product application station comprises:
cooling the group of metal wires to a temperature between 10° C. and 30° C. inclusive; then
reheating the group of metal wires to the temperature between 60° C. and 120° C. inclusive.

12. The method as claimed in claim 11, in which the group of metal wires is cooled by a flow of air and heated by induction.

13. The method as claimed in claim 1, in which the die is part of an extrusion head where there are successively deposited on the group of metal wires:
an adhesion primer; and
the plastic material of the sheath.

14. The method as claimed in claim 13, in which when the extrusion head has passed through it a portion of the strand in which the group of metal wires is coated with the first filler product, a rate of injection of the adhesion primer is reduced relative to a moment at which the extrusion head has passed through it a portion of the strand in which the group of metal wires is coated with the second filler product.

15. The method as claimed in claim 1, comprising, downstream of the die:
cooling the group of metal wires enveloped in the sheath in a water bath.

16. An individually sheathed strand, comprising:
a group of metal wires;
a first filler product filling the interstices between the metal wires and surrounding the metal wires in a first portion of the strand;
a second filler product, distinct from the first filler product and filling the interstices between the metal wires and surrounding the metal wires in a second portion of the strand distinct from the first portion of the strand, the second portion of the strand being void of first filler product and the first portion of the strand being void of second filler product; and
a sheath of extruded plastic material extending continuously and of constant exterior section, wherein in the first portion of the strand, the sheath surrounds the group of metal wires and the first filler product, and wherein in the second portion of the strand, the sheath surrounds the group of metal wires and the second filler product,
the second filler product adhering both to the metal wires and to the internal surface of the sheath, the first and second portions extending in succession along the strand, the second filler product having a greater adhesion to the group of metal wires and the sheath than the first filler product.

17. The individually sheathed strand as claimed in claim 16, having at least one third portion situated between the first portion and the second portion, wherein in the at least one third portion, the sheath surrounds the group of metal wires and a mixture of the first and second filler products.

18. The individually sheathed strand as claimed in claim 17, in which each third section has a length between 20 cm and 3 m inclusive.

19. The individually sheathed strand as claimed in claim 16, wherein, in the first portions the sheath of the strand does not adhere to the group of metal wires and in second portions the sheath adheres to the group of metal wires.

20. The individually sheathed strand as claimed in claim 16, wherein the first filler product has lubricating properties.

21. The individually sheathed strand as claimed in claim 16, wherein the second filler product is a resin.

22. The individually sheathed strand as claimed in claim 16, the sheathed strand being part of an anchor of an anchored structure.

* * * * *